United States Patent
Hong et al.

(10) Patent No.: US 8,254,026 B2
(45) Date of Patent: Aug. 28, 2012

(54) THREE-DIMENSIONAL IMAGE DISPLAY

(75) Inventors: Hyung Ki Hong, Seoul (KR); Byung Joo Lee, Gwacheon-si (KR); Hee Jin Im, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 802 days.

(21) Appl. No.: 12/116,477

(22) Filed: May 7, 2008

(65) Prior Publication Data

US 2008/0278483 A1 Nov. 13, 2008

(30) Foreign Application Priority Data

May 7, 2007 (KR) .................... 10-2007-0044086

(51) Int. Cl.
*G02B 27/22* (2006.01)
(52) U.S. Cl. .................... 359/463; 348/59
(58) Field of Classification Search ............. 359/463; 348/59
See application file for complete search history.

(56) References Cited

U.S. PATENT DOCUMENTS

| | | | |
|---|---|---|---|
| 6,064,424 A * | 5/2000 | van Berkel et al. | 348/51 |
| 6,801,243 B1 * | 10/2004 | Van Berkel | 348/59 |
| 2005/0259323 A1 * | 11/2005 | Fukushima et al. | 359/462 |
| 2007/0201133 A1 * | 8/2007 | Cossairt | 359/463 |
| 2008/0191966 A1 * | 8/2008 | Van Berkel | 345/32 |
| 2009/0116108 A1 * | 5/2009 | Levecq et al. | 359/463 |

* cited by examiner

*Primary Examiner* — Lee Fineman
(74) *Attorney, Agent, or Firm* — Brinks Hofer Gilson & Lione

(57) ABSTRACT

A three-dimensional image display capable of reducing a difference between a resolution variation rate in a pixel column direction and a resolution variation rate in a pixel row direction and preventing a color separation phenomenon is disclosed. The three-dimensional image display includes a display panel in which n (n is a natural number) disparity images are displayed and the same disparity images are distributed and displayed in subpixels of the same color, and a lenticular sheet which divides travel paths of the disparity images using a plurality of lenticular lenses which are obliquely arranged in front of the display panel, and the long axes of the lenticular lenses are parallel to an extension line of the subpixels in which the same disparity images are displayed.

2 Claims, 9 Drawing Sheets

FIG. 8
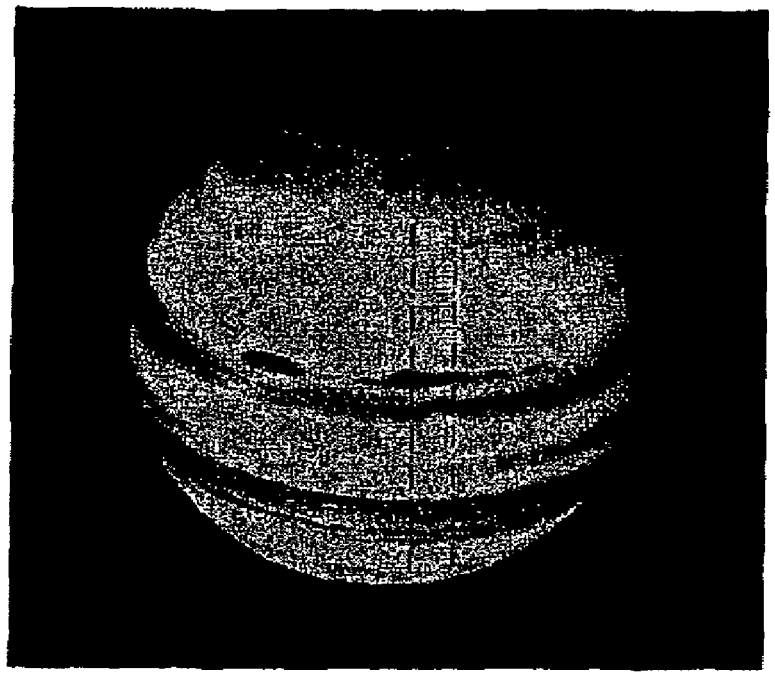
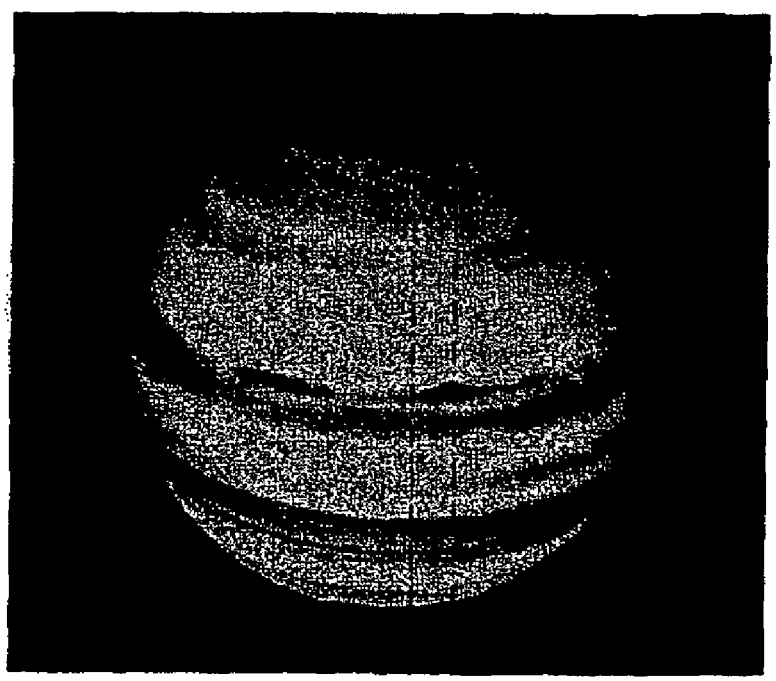

THREE-DIMENSIONAL IMAGE DISPLAY

CLAIM OF PRIORITY

This application claims the benefit of Korean Patent Application No. 10-2007-0044086, filed on May 7, 2007, which is hereby incorporated by reference as if fully set forth herein.

BACKGROUND OF THE INVENTION

1. Field of the Invention

The present invention relates to a three-dimensional image display, and more particularly, to a three-dimensional image display capable of reducing a difference between a resolution variation rate in a pixel column direction and a resolution variation rate in a pixel row direction and preventing a color separation phenomenon.

2. Discussion of the Related Art

One factor for recognizing a three-dimensional image is a binocular disparity phenomenon in which images viewed in different directions are perceived by a viewer's eyes. Different two-dimensional images perceived by the viewer's eyes are synthesized by the user's brain so as to be viewed as a three-dimensional image. A three-dimensional image display allows a viewer to view a three-dimensional image using the binocular disparity phenomenon. That is, the three-dimensional image display allows the viewer to view the three-dimensional image by allowing different disparity images to be perceived by the viewer's left eye and right eye.

In order to realize the three-dimensional image display, various methods of allowing different images to be perceived by a viewer's eyes have been studied. Among them, as shown in FIGS. 1 and 2, there is a lenticular lens type three-dimensional image display.

Referring to FIG. 1, a lenticular lens type three-dimensional image display is formed by attaching a lenticular sheet 21 including a lenticular lens array to a display panel 11. The path of a two-dimensional image displayed on the display panel 11 is divided by lenses of the lenticular sheet 21. In more detail, an image incident to the left side of a convex lens is refracted toward the viewer's right eye through the lens and an image incident to the right side of the convex lens is refracted toward the viewer's left eye by the lens. The two-dimensional images perceived by the left eye and the right eye are recognized by the viewer as the three-dimensional image.

A simple method of realizing the three-dimensional image using the lenticular sheet 21 is a 2-view method of alternately arranging two images including a left-eye image and a right-eye image in a pixel column direction x of the display panel 11, as shown in FIG. 2. In the 2-view method, the left-eye image is perceived by the viewer's left eye through the lens and the right-eye image is perceived by the viewer's right eye such that the viewer recognizes the three-dimensional image. The number of disparity images which are actually viewed by the viewer is infinite. However, in the 2-view method, since only the two disparity images are viewed so as to realize three-dimensional effect, the three-dimensional effect is unnatural.

Recently, in order to realize more natural three-dimensional effect, multi-view methods which are obtained by increasing the number of disparity images, such as a 4-view method, a 9-view method, a 36-view method, a 60-view method and a 72-view method, have been developed.

As the number of views is increased, a difference between a resolution variation rate in a pixel column direction x and a resolution variation rate in a pixel row direction y of the three-dimensional image display is increased. In order to solve this problem, the lenticular sheet 21 is provided in front of the display panel 11 such that the long axes L of the lenses included in the lenticular sheet 21 is inclined with respect to the pixel row direction y.

Hereinafter, in the 9-view method, for example, the resolution variation rate in the pixel column direction x and the resolution variation rate in the pixel row direction y of the three-dimensional image display according to the increase in number of views will be described with reference to FIGS. 3A and 3B. In the 9-view method, a group g includes first to ninth disparity images which are displayed in subpixels in one-to-one correspondence. The disparity images having the same number are images photographed in the same direction and the disparity images having adjacent numbers are images photographed in adjacent directions.

As shown in FIG. 3A, the same disparity images are displayed in the pixel row direction y of the display panel 11 and the first to ninth disparity images are sequentially displayed in the pixel column direction x. If the long axes L of the lenses of the lenticular sheet 21 are aligned in parallel in the pixel row direction y of the display panel 11, the resolution in the pixel row direction y does not deteriorate, but the resolution in the pixel column direction x is reduced to ⅑. The deterioration of the resolution in the pixel column direction x is increased as the number of disparity images is increased. Since the deterioration of the resolution is increased in only the pixel column direction x, the image quality of the three-dimensional image perceived by the viewer deteriorates.

In order to prevent the deterioration of the resolution in only the pixel column direction x, as shown in FIG. 3B, the first to ninth disparity images are distributed and displayed in the pixel column direction x and the pixel row direction y of the display panel 11 such that the long axes L of the lenses are obliquely aligned relative to the pixel row direction y. At this time, the same disparity images included in the respective groups g are distributed in subpixels 31 of different colors R, G and B, in order to realize a multi-color image.

An angle between the long axes L of the lenses and the pixel row direction y is a value for allowing the subpixels 31 of different colors, in which the same disparity images are displayed, to be adjacent to each other. The value of the angle suggested is about 9.46° (=arctan(⅙)).

If the angle between the long axes L of the lenses and the pixel row direction y is 9.46° (=arctan(⅙)), the resolution in the pixel column direction x is reduced to 1/n/2 (n is the number of views, that is, the number of disparity images). That is, as shown in FIG. 3B, in the 9-view method, the resolution in the pixel row direction y is reduced to ½ and the resolution in the pixel column direction is reduced to ¼.5. By obliquely aligning the long axes L of the lenses, a difference between the resolution variation rate in the pixel row direction y and the resolution variation rate in the pixel column direction x is reduced compared with that shown in FIG. 3A and an image quality deterioration phenomenon can be suppressed.

Although the long axes L of the lenses are obliquely aligned by 9.46° (=arctan(⅙)) relative to the pixel row direction y so as to suppress the image quality deterioration phenomenon, the long axes L of the lenses may be obliquely aligned by other angles. As described above, even when the long axes L of the lenses are obliquely aligned by any angle relative to the pixel row direction y, the same disparity images may be displayed in subpixels of different colors in order to realize a multi-color image. The adjacent subpixels of different colors R, G and B, in which the same disparity images are displayed, are arranged as shown in FIGS. 4A and 4B.

The multi-color image is realized by overlapping red (R), green (G) and blue (B) colors. However, since the same disparity images are included in different groups g, the subpixels of red (R), green (G) and blue (B) color for realizing the multi-color image are too separated from one another and thus an overlap area may not be generated. Accordingly, the viewer cannot recognize the multi-color image which is displayed by overlapping red (R), green (G) and blue (B) colors and can recognize the respective separated colors.

As described above, in the related art three-dimensional image display, the long axes of the lenticular lenses are inclined by a predetermined angle relative to the pixel row direction such that the difference between the resolution variation rate in the pixel column direction and the resolution variation rate in the pixel row direction is reduced and the image quality of the three-dimensional image is improved. However, the angle between the pixel row direction and the long axes of the lenticular lenses causes another image quality deterioration problem, that is, a color separation phenomenon.

SUMMARY OF THE INVENTION

Accordingly, the present invention is directed to a three-dimensional image display that substantially obviates one or more problems due to limitations and disadvantages of the related art.

An object of the present invention is to provide a three-dimensional image display capable of reducing a difference between a resolution variation rate in a pixel column direction and a resolution variation rate in a pixel row direction and preventing a color separation phenomenon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a three-dimensional image display including a display panel in which n (n is a natural number) disparity images are displayed and the same disparity images are distributed and displayed in subpixels of the same color; and a lenticular sheet which divides travel paths of the disparity images using a plurality of lenticular lenses which are obliquely arranged in front of the display panel, wherein the long axes of the lenticular lenses are parallel to an extension line of the subpixels in which the same disparity images are displayed.

An angle between the long axes of the lenticular lenses and a pixel row direction of the display panel may be arctan(1/5).

Resolution of a three-dimensional image, which is viewed by a viewer through the lenticular sheet, in a pixel column direction may be 1/5 of resolution of a two-dimensional image in the pixel column direction, and resolution of the three-dimensional image, which is viewed by a viewer through the lenticular sheet, in a pixel row direction may be 1/(n/5) of resolution of the two-dimensional image in the pixel row direction.

The n disparity images may be divided into a plurality of groups, which are distributed and displayed on the display panel.

An $r^{th}$ (r is a natural number of n−2 or less) disparity image, an $(r+1)^{th}$ disparity image and an $(r+2)^{th}$ disparity image may be displayed in the subpixels of different colors.

An $r^{th}$ (r is a natural number of n−2 or less) disparity image, an $(r+1)^{th}$ disparity image and an $(r+2)^{th}$ disparity image may overlap each other through the lenticular sheet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 is a view showing the result of displaying Jupiter in the three-dimensional image display shown in FIG. 7 and photographing Jupiter while moving a camera.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, preferred embodiments of the present invention will be described with reference to FIGS. 5 to 8.

Figure 1:
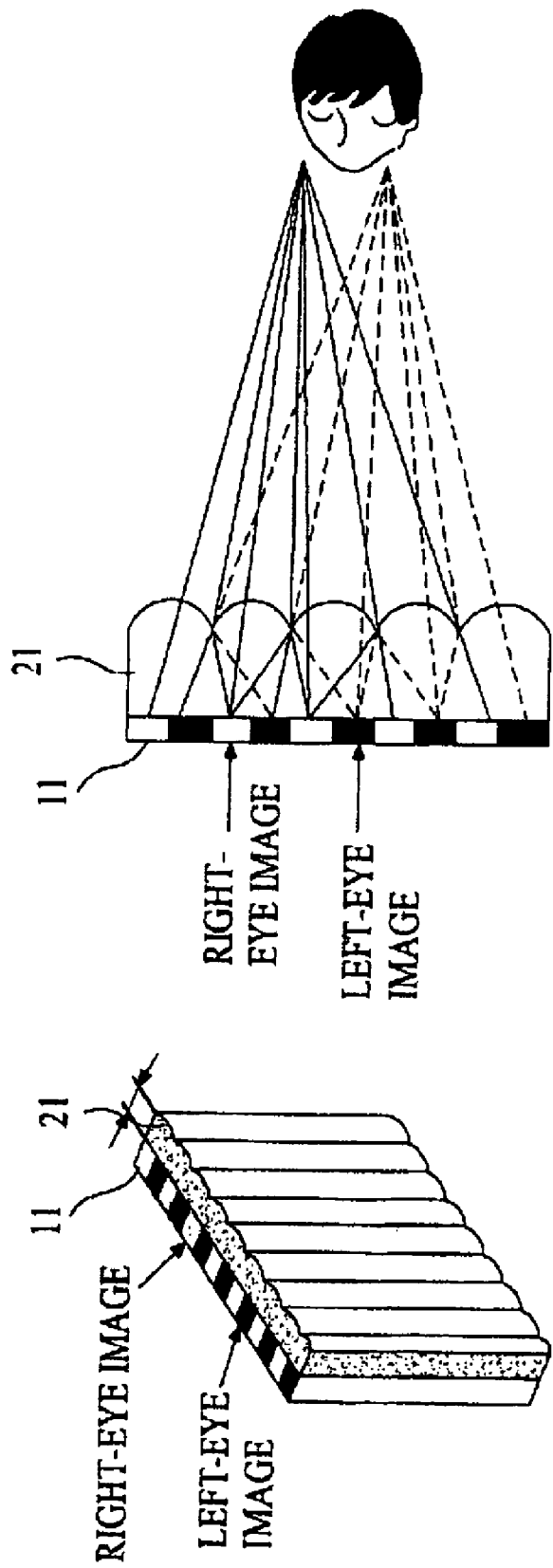
FIG. 1 is a view showing a related art three-dimensional image display using a lenticular sheet.
Figure 2:
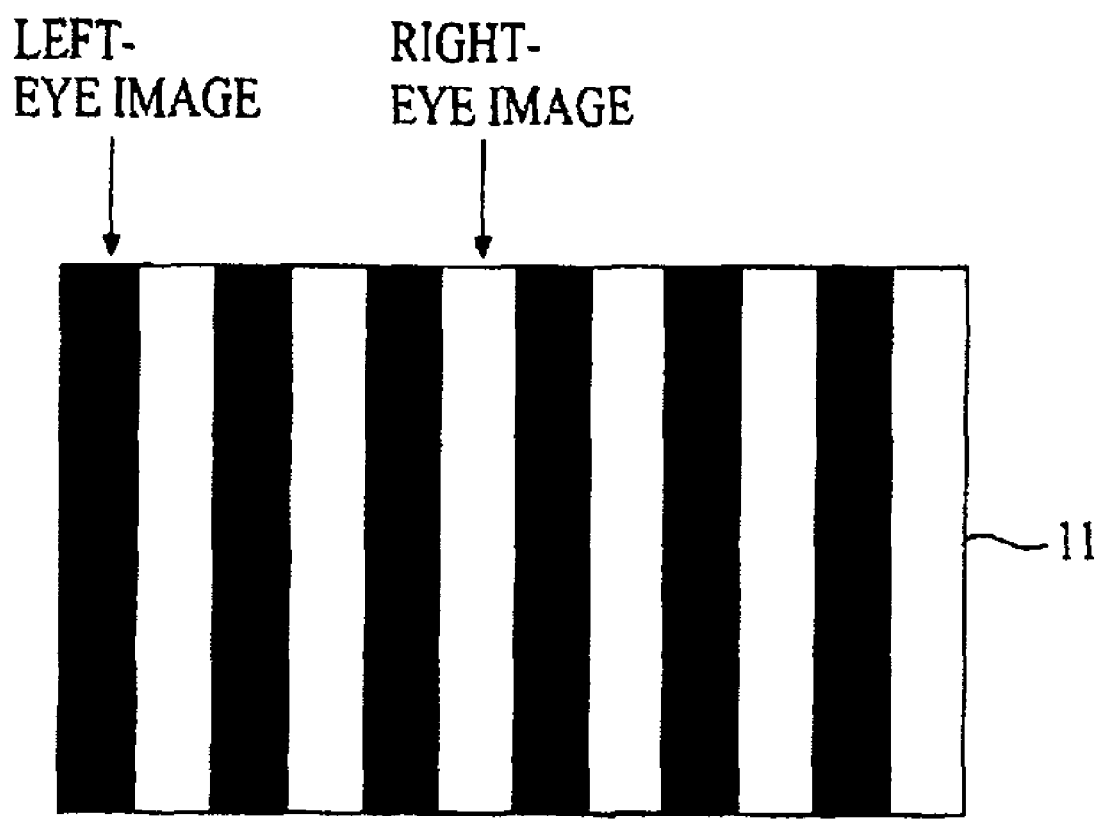
FIG. 2 is a view showing a related art 2-view type three-dimensional image display.
Figure 3A:
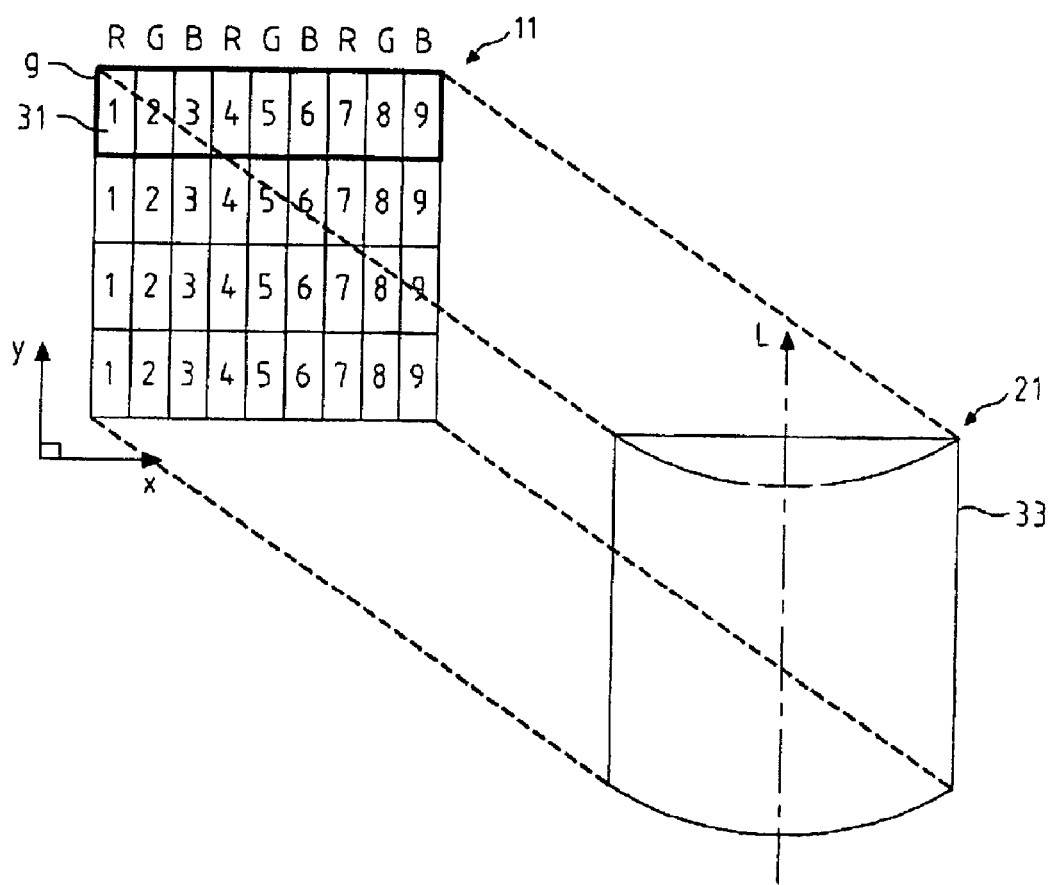
FIGS. 3A and 3B are views showing an example of a related art three-dimensional image display for displaying a plurality of disparity images.
Figure 3B:
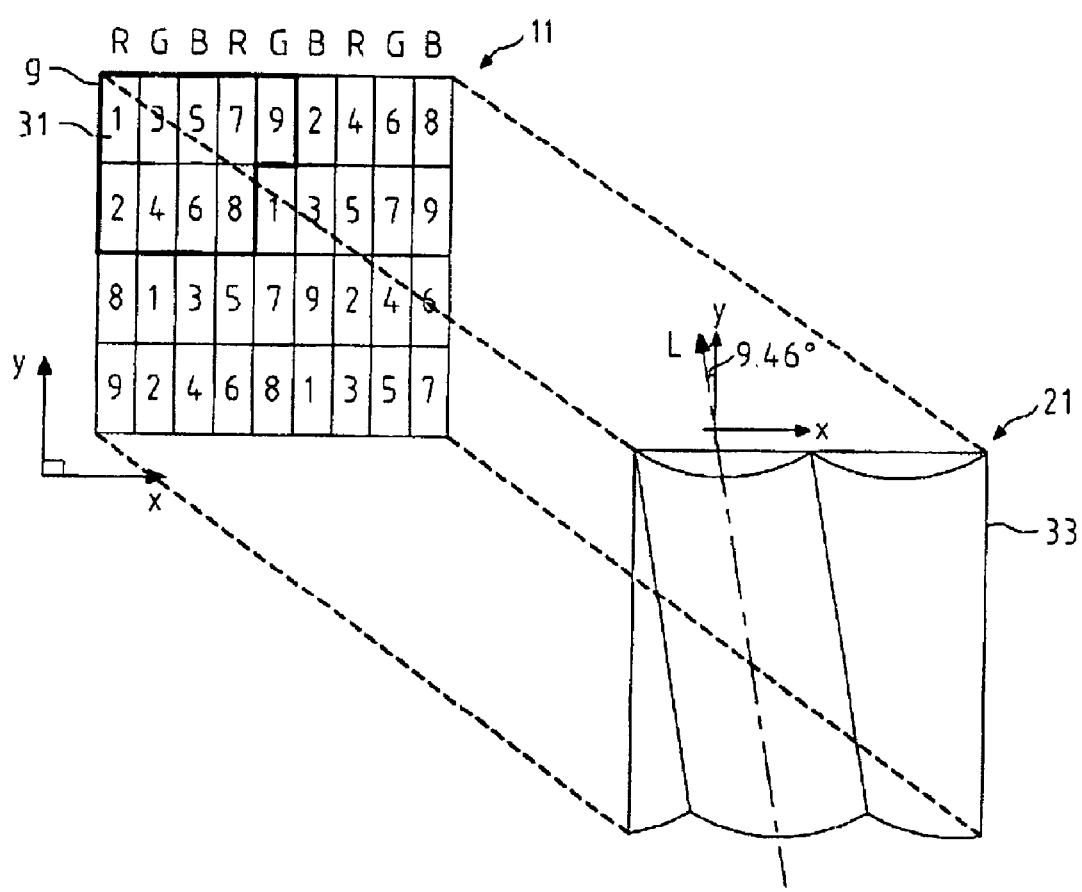
Figure 4A:
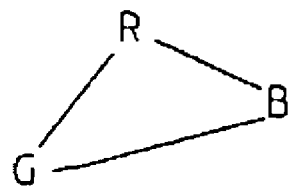
FIGS. 4A and 4B are views illustrating a related art method of arranging the same disparity images (that is, images photographed in the same direction) in subpixels in order to prevent image distortion.
Figure 4B:
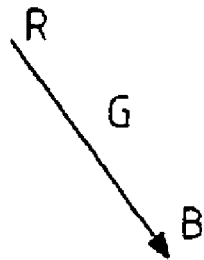
Figure 5:
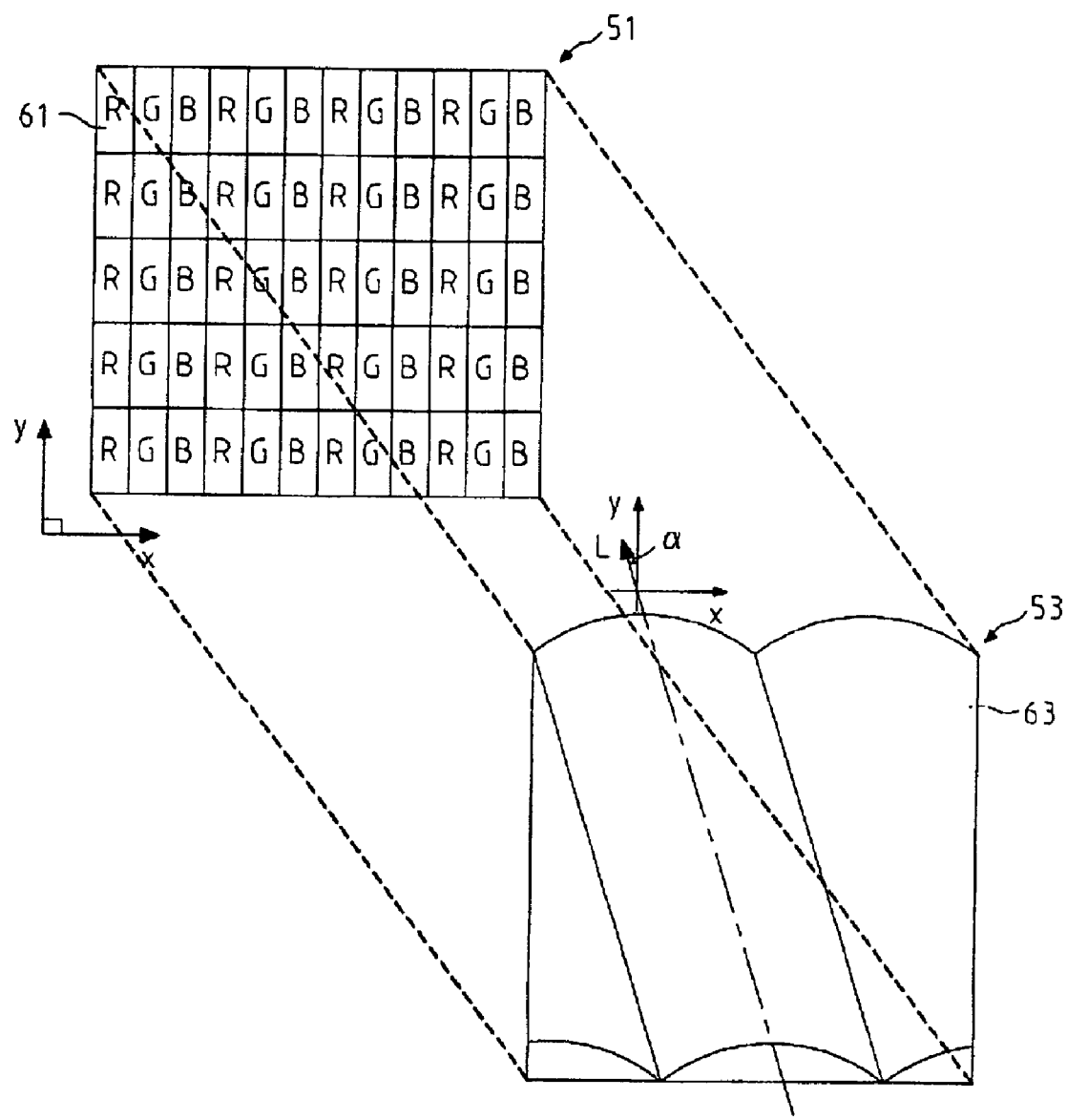
FIG. 5 is a view showing a three-dimensional image display according to an embodiment of the present invention.

As shown in FIG. 5, a three-dimensional image display according to an embodiment of the present invention includes a display panel 51 which includes subpixels 61 of red (R), green (G) and blue (B) colors and displays data and a lenticular sheet 53 provided in front of the display panel 51. The lenticular sheet 53 includes a plurality of lenticular lenses 63 which are arranged in parallel.

The long axes L of the lenticular lenses 63 are inclined by a predetermined angle α relative to a pixel row direction y of the display panel 51, in order to reduce a difference between a resolution variation rate in a pixel column direction x and a resolution variation rate in the pixel row direction y.

Any well-known display panel may be used as the display panel 51. For example, the display panel 51 includes any one of a liquid crystal display panel (LCD), an organic light emitting diode display panel (OLED) and a plasma display panel (PDP).

In subpixels 61, n disparity images for realizing the three-dimensional image are distributed and displayed according to groups. In the embodiment of the present invention, the same disparity images which are distributed and displayed in the groups are displayed in the subpixels 61 of the same color. Accordingly, the long axes of the lenticular lenses 63 are parallel to the extension line of the subpixels 61 of the same color, in which the same disparity images are displayed.

Figure 6:
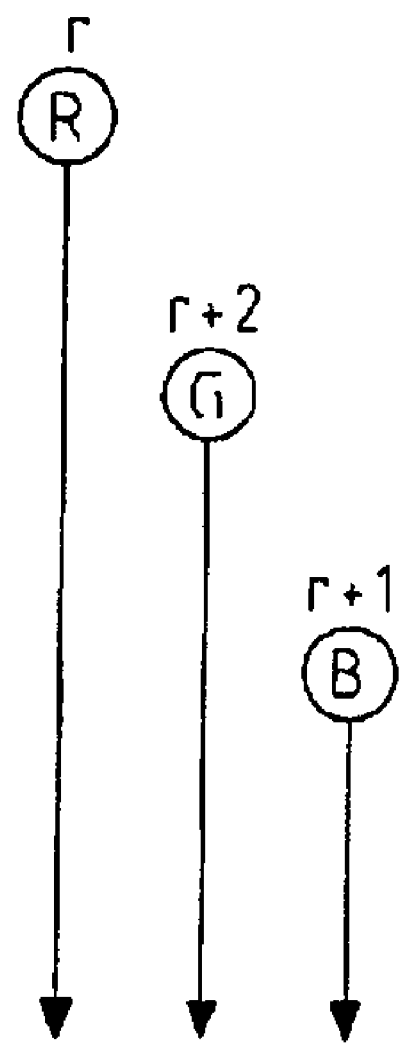
FIG. 6 is a view showing an example of a method of arranging the disparity images in subpixels according to the embodiment of the present invention.

The three-dimensional image display according to the embodiment of the present invention can display a multi-color image by overlapping different disparity images of different colors, although the same disparity images are displayed with the same color. The overlap occurs between adjacent disparity images as shown in FIG. 6. For example, an $r^{th}$ (r is a natural number of n−2 or less) disparity image overlaps an $(r+1)^{th}$ disparity image and an $(r+2)^{th}$ disparity image adjacent thereto. These images are displayed in the subpixels of different colors. As the number of views is increased, that is, as the number of disparity images is increased, a photographing interval between adjacent disparity images becomes narrow and the adjacent disparity images overlap each other so as to be perceived by the viewer's eyes. In the multi-view type three-dimensional image display according to the embodiment of the present invention, although the multi-color image is realized through different disparity images, since the adjacent disparity images overlap each other, it is possible to realize a natural multi-color image.

As described above, in the three-dimensional image display according to the embodiment of the present invention, it is possible to realize a natural multi-color image by overlapping adjacent different disparity images of different colors. In the present invention, since the overlapped disparity images are displayed with different colors to realize the multi-color image, it is possible to prevent a color separation phenomenon. In the three-dimensional image display according to the embodiment of the present invention, since a plurality of disparity images are displayed, the three-dimensional image which is naturally moved according to the motion of the viewer is perceived.

In the three-dimensional image display according to the embodiment of the present invention, since the same disparity images are not arranged in the subpixels 61 of different colors, it is possible to simplify a method of arranging the disparity images.

In the multi-view type three-dimensional image display, the long axes L of the lenticular lenses are obliquely aligned relative to the pixel row direction y, in order to reduce the difference between the resolution variation rate in the pixel column direction x and the resolution variation rate in the pixel row direction y of the three-dimensional image, compared with the resolution of a two-dimensional image of the display panel 51. In the embodiment of the present invention, the long axes L of the lenticular lenses are parallel in the same disparity images. An angle between the long axes L of the lenticular lenses and the pixel row direction y is set to arctan(1/5).

If the long axes L of the lenticular lenses are obliquely aligned by the angle arctan(1/5) relative to the pixel row direction y like the embodiment of the present invention, the resolution of the three-dimensional image in the pixel row direction y is reduced to 1/5 of that of the two-dimensional image of the display panel 51. The resolution of the three-dimensional image in the pixel column direction x is reduced to 1/(n/5) of that of the two-dimensional image of the display panel 51. Accordingly, it is possible to reduce the difference between the resolution variation rate in the pixel column direction x and the resolution variation rate in the pixel row direction y, compared with the related art.

Figure 7:
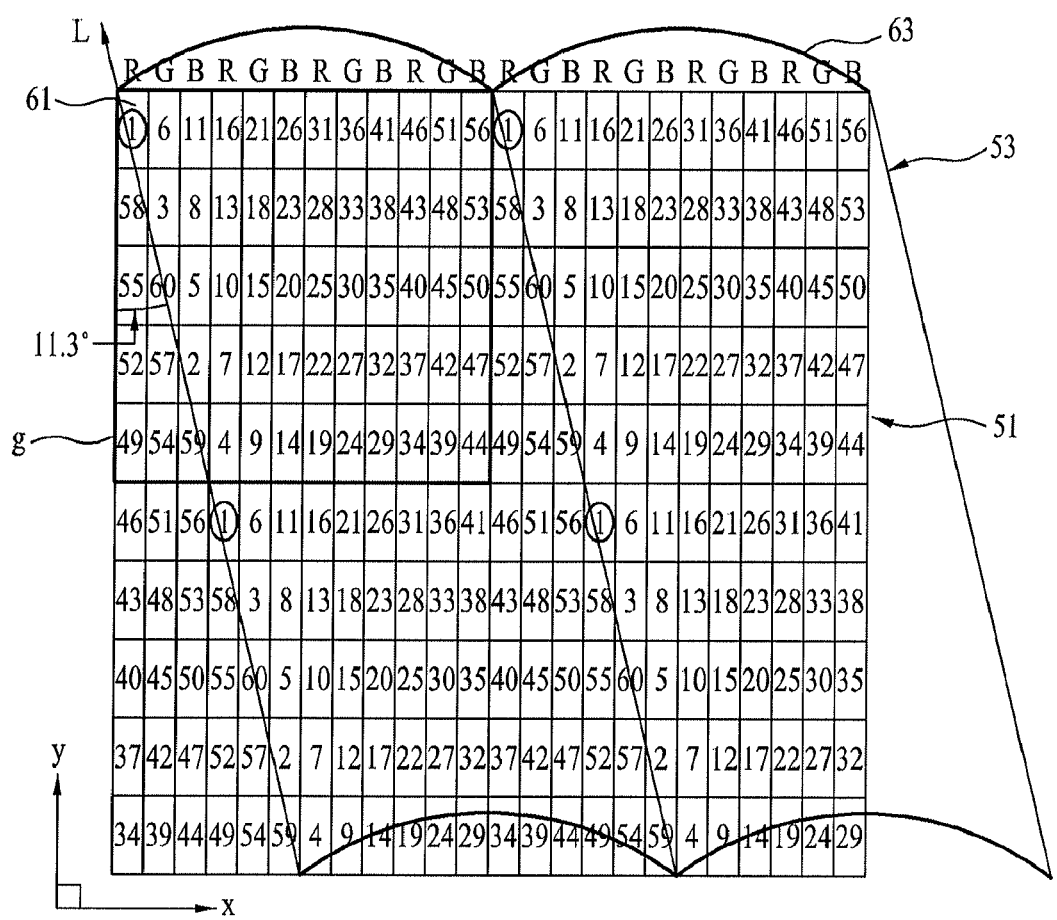
FIG. 7 is a view showing a case where the embodiment of the present invention applies to a 60-view type three-dimensional image display.

FIG. 7 and Table 1 show a 60-view disparity image in a 15.1-inch liquid crystal display panel LCD and FIGS. 5 and 6 show the embodiment of the present invention.

TABLE 1

| Size of 2D LCD | 2D resolution | Size of subpixel | Inclination angle (α) of lens | Number of views |
|---|---|---|---|---|
| 15.1" | 3200 × 2400 | 32 × 96 μm | Arctan(1/5) ≈ 11.3° | 60 |

Referring to FIG. 7 and Table 1, the 60-view type three-dimensional image display according to the embodiment of the present invention includes 60 disparity images and the disparity images of each group g are distributed and displayed in the subpixels 61 of the display panel 51. At this time, the same disparity images included in respective groups g are arranged in the subpixels 61 of the same color and two adjacent disparity images are arranged in the subpixels 61 of different colors. For example, if a disparity image 1 is displayed in the subpixel of red (R) color, a disparity image 2 adjacent to the disparity image 1 is displayed in the subpixel of blue (B) color and a disparity image 3 adjacent to the disparity image 2 is displayed in the subpixel of green (G) color. When the lenticular sheet 53 is arranged on the display panel 51 having the above-described condition, the long axes L of the lenses 63 are obliquely aligned by arctan(1/5) relative to the pixel row direction y of the display panel 51.

In FIG. 7 and Table 1, the resolution of the three-dimensional (3D) image is reduced to 1/12 in the pixel column direction and is reduced to 1/5 in the pixel row direction as shown in Table 2.

TABLE 2

| 3D resolution |
|---|
| 255 × 480 |

In the result of Table 2, if the disparity images are repeatedly arranged only in the pixel column direction of the display panel 51 and the long axes L of the lenses 63 are parallel to the pixel row direction y of the display panel 51, the resolution is reduced to 1/60 only in the pixel column direction and the resolution of the three-dimensional image is changed to 53×2400. Thus, it is possible to prevent image distortion.

In the result of Table 2, if the long axes L of the lenses 63 are obliquely aligned by 9.46° (=arctan(1/6)) relative to the pixel row direction y of the display panel 51, the resolution is reduced to 1/30 in the pixel column direction and is reduced to 1/2 in the pixel row direction and thus the difference between the resolution variation rate in the pixel column direction and the resolution variation rate in the pixel row direction can be more reduced compared with the case where the resolution of the three-dimensional image is changed to 106×1200. Thus, in the three-dimensional image display according to the embodiment of the present invention, it is possible to improve an image quality deterioration problem of the three-dimensional image due to the large difference between the resolution variation rate in the pixel column direction and the resolution variation rate in the pixel row direction.

FIG. 8 is a view showing a result of displaying Jupiter in the three-dimensional image display manufactured under the condition shown in FIG. 7 and Table 1 and photographing Jupiter while changing the position of a camera.

Referring to FIG. 8, it can be seen that a black spot of Jupiter is slowly changed according to the motion of the camera. Although the same disparity images is displayed with the same color, adjacent disparity images of different colors are simultaneously viewed by the viewer's eyes and thus a multi-color image can be viewed without a color separation phenomenon.

As described above, since the three-dimensional image display according to the embodiment of the present invention is the multi-view type three-dimensional image display in which the long axes of the lenticular lenses are obliquely aligned, the three-dimensional image which is naturally moved according to the motion of the viewer is perceived.

In the three-dimensional image display according to the embodiment of the present invention, since the long axes of the lenses are obliquely aligned relative to the pixel row direction, it is possible to prevent the deterioration of the image quality due to the difference between the resolution variation rate in the pixel column direction and the resolution variation rate in the pixel row direction, compared with the resolution of the two-dimensional resolution of the display panel.

In the three-dimensional image display according to the embodiment of the present invention, it is possible to realize a natural multi-color image by displaying the same disparity images in the subpixels of the same color and overlapping the adjacent different disparity images of different colors. As a result, in the three-dimensional image display according to the embodiment of the present invention, since the overlapped disparity images are displayed with different colors so as to realize a multi-color image, it is possible to prevent a color separation phenomenon.

In the three-dimensional image display according to the embodiment of the present invention, since the same disparity images are not arranged in the subpixels of different colors, it is possible to simplify the method of arranging the disparity images.

In the three-dimensional image display according to the embodiment of the present invention, it is possible to reduce the difference between the resolution variation rate in the pixel column direction and the resolution variation rate in the pixel row direction and prevent the color separation phenomenon. Thus, it is possible to reduce eyestrain.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A three-dimensional image display comprising: a display panel in which n disparity images are displayed and the same disparity images are distributed and displayed in subpixels of the same color, wherein the n disparity images are divided into a plurality of groups, which are distributed and displayed on the display panel; and a lenticular sheet which divides travel paths of the disparity images using a plurality of lenticular lenses which are obliquely arranged in front of the display panel, wherein each group includes a plurality of different disparity images;

wherein long axes of the lenticular lenses are parallel to an extension line of the subpixels in which the same disparity images are displayed such that the same disparity images included in different groups are positioned along the extension line;

wherein the same disparity images are photographed in the same direction;

wherein resolution of a three-dimensional image, which is viewed by a viewer through the lenticular sheet, in a pixel column direction is $1/5$ of resolution of a two-dimensional image in the pixel column direction, and resolution of the three-dimensional image, which is viewed by the viewer through the lenticular sheet, in a pixel row direction is $1/(n/5)$ of resolution of the two-dimensional image in the pixel row direction;

wherein an r th disparity image, an (r+1) th disparity image and an (r+2) th disparity image are displayed in the subpixels of different colors, wherein r is a natural number of n−2 or less;

wherein an r th disparity image, an (r+1) th disparity image and an (r+2) th disparity image overlap each other through the lenticular sheet, wherein r is a natural number of n−2 or less;

wherein all the r th disparity images are displayed in a subpixel of red color;

wherein all the (r+1) th disparity images are displayed in a subpixel of blue color;

wherein all the (r+2) th disparity images are displayed in a subpixel of green color.

2. The display according to claim 1, wherein an angle between the long axes of the lenticular lenses and a pixel row direction of the display panel is arctan($1/5$).

* * * * *